United States Patent
Yang

(10) Patent No.: US 7,051,138 B2
(45) Date of Patent: May 23, 2006

(54) INTERRUPT-PROCESSING SYSTEM FOR SHORTENING INTERRUPT LATENCY IN MICROPROCESSOR

(75) Inventor: Pachinco Yang, HsinChu (TW)

(73) Assignee: Novatek Microelectronic Corp., Hsinchu (TW)

( * ) Notice: Subject to any disclaimer, the term of this patent is extended or adjusted under 35 U.S.C. 154(b) by 187 days.

(21) Appl. No.: 10/648,195

(22) Filed: Aug. 27, 2003

(65) Prior Publication Data

US 2005/0060461 A1    Mar. 17, 2005

(30) Foreign Application Priority Data

Mar. 7, 2003    (TW) .............................. 92105040 A

(51) Int. Cl.
  *G06F 13/24*    (2006.01)
  *G06F 12/10*    (2006.01)
  *G06F 12/00*    (2006.01)

(52) U.S. Cl. ...................... 710/260; 710/266; 711/215; 711/206; 711/113

(58) Field of Classification Search ................ 710/260, 710/266; 711/113, 206, 221, 215
  See application file for complete search history.

(56) References Cited

U.S. PATENT DOCUMENTS

| | | | |
|---|---|---|---|
| 6,378,023 B1* | 4/2002 | Christie et al. ............. | 710/260 |
| 6,601,122 B1* | 7/2003 | Broberg et al. ............. | 710/266 |
| 6,704,863 B1* | 3/2004 | Paul et al. .................. | 712/244 |
| 6,889,279 B1* | 5/2005 | Godfrey ..................... | 710/269 |

* cited by examiner

*Primary Examiner*—Tim Vo
*Assistant Examiner*—Christopher Daley
(74) *Attorney, Agent, or Firm*—Troxell Law Office, PLLC

(57) ABSTRACT

The invention relates to a data processing system which comprises a memory module and a microprocessor. The memory modules comprise at least one low-speed memory and one high-speed memory; both store an interrupt vector table individually for recording the entry instruction of interrupt service routines. The microprocessor comprises a central processing unit (CPU) and a memory controller with a re-addressing device. Once an interruption occurs, the CPU generates and sends an interrupt vector address to the memory controller. If the vector is located in the range of interrupt vector table, the re-addressing device sends an enable signal to the high-speed memory to enable the CPU to fetch the entry instruction of interrupt service routines from the high-speed memory, not from the pre-determined low-speed memory. Hence, the interrupt latency is reduced.

14 Claims, 5 Drawing Sheets

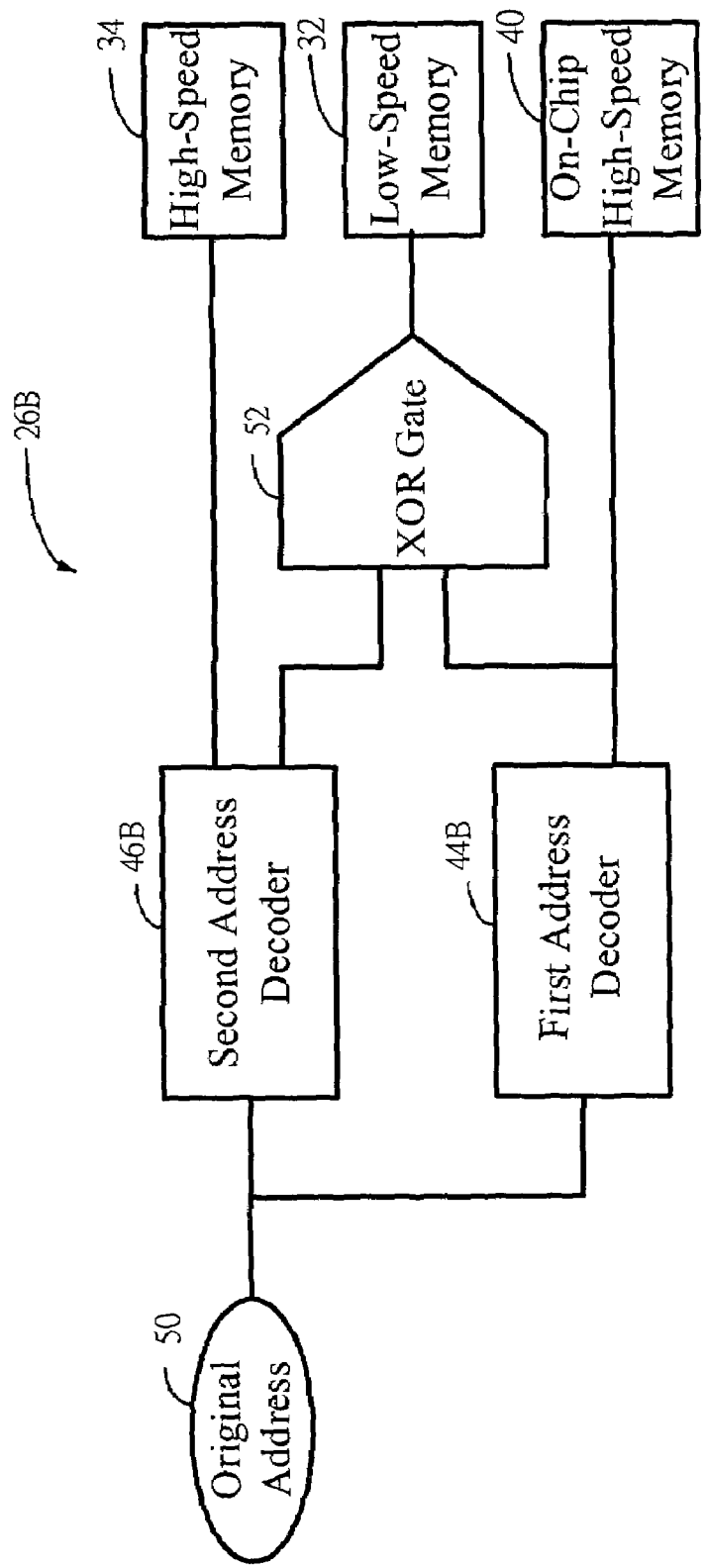

INTERRUPT-PROCESSING SYSTEM FOR SHORTENING INTERRUPT LATENCY IN MICROPROCESSOR

BACKGROUND OF THE INVENTION

1. Field of the Invention

The present invention relates to a data processing system, and more particularly, the present invention relates to a data processing system for the interrupt latency of the microprocessor.

2. Description of the Prior Art

In the microprocessor used in common electronic, non-personal computer, devices such as a digital camera, the interrupt vector table of the data processing system comprises a set of vector addresses; each address stores an entry instruction of the interrupt service routine (The entry instruction is the first instruction of the whole interrupt service routine). When the central processing unit (CPU) accepts an interrupt request, the CPU reads the interrupt vector table and executes the interrupt service routine corresponded to the interrupt request.

In this type of data processing system, because the address of the reset vector is next to the other vectors, when booting the microprocessor, the CPU fetches the first program instruction of the whole application program in the reset vector to execute; therefore, the reset vector must be located in the non-volatile memory, such as the erasable programmable read-only memory (EPROM) or the flash read-only memory (Flash ROM) . . . etc.

However, when the CPU reads the non-volatile memory, the reading speed is slow; therefore, in real practice, the whole application program, comprised of the interrupt service routines, will be copied into the higher speed volatile memory to be executed by the CPU for increasing the executing efficiency.

Referring to FIG. 1, FIG. 1 is a function block diagram of a conventional data processing system 1. The data processing system 1 comprises a set of memory modules 30 for storing program instructions and data, a microprocessor 20, a power source 28, and a bus 60.

The memory modules 30 comprise a low-speed memory 32 and a high-speed memory 34. The low-speed memory 32 stores an interrupt vector table 36 for recording at least one entry instruction of an interrupt service routine.

The power source 28 is used for providing electrical power to the data processing system 1. The power source 28 comprises a switch 29. When the power source 28 is shut down, the program instructions and data stored in the high-speed memory 34 are lost; however,-the program instructions and data stored in the low-speed memory are preserved.

The microprocessor 20 comprises a CPU 22 for executing program instructions and calculating data. The CPU 22 is designed to fetch program instructions in the low-speed memory 32 when an interruption occurs.

The bus 60 is used for connecting to the CPU 22 and the memory modules 30 for transmitting program instructions and data.

When an interruption occurs, the CPU 22 fetches the corresponding entry instruction of the interrupt service routine in the interrupt vector table 36 of the low-speed memory 32.

By the restriction of the basic architecture of the CPU, when an interruption occurs, the CPU fetches the entry instruction of the interrupt service routine in the low-speed non-volatile memory, and thenbranches to the rest of program located in the high speed memory. Although this method is commonly used, the interrupt service efficiency of the CPU is restricted. If the interrupt latency can be reduced, the system executing efficiency can be improved.

SUMMARY OF THE INVENTION

The objective of the present invention is to provide a data processing system for reducing the interrupt latency, so as to increase the interrupt service efficiency.

According to an embodiment of the present invention, the data processing system comprises a set of memory modules for storing program instructions and data, a microprocessor, a power source for providing electrical power to the data processing system, and a bus.

The set of memory modules comprise a low-speed memory and a high-speed memory. Both the low-speed memory and the high-speed memory store an interrupt vector table 36 individually for recording at least one entry instruction of the interrupt service routine.

The power source comprises a switch. When the power source is shut down, program instructions and data stored in the high-speed memory are lost; however, program instructions and data stored in the low-speed memory are preserved.

The microprocessor comprises a central processing unit (CPU) for executing program instructions and calculating data. The CPU is designed to fetch the program instructions in the low-speed memory when an interruption occurs.

The microprocessor further comprises a memory controller; under the memory controller's control, the CPU fetches the program instruction and accesses the data in the set of memory modules. The memory controller also comprises a re-addressing device.

The bus connects to the CPU, the memory controller, and the set of memory modules for transmitting program instructions and data.

When the interruption occurs, the CPU generates an interrupt vector address to the memory controller. If the re-addressing device of the memory controller identifies that the address falls within the address range of the interrupt vector table, the re-addressing device sends out an enable signal to the high-speed memory which enables the CPU to fetch the corresponding entry instruction of the interrupt service routines in the high-speed memory, instead of the predetermined low-speed memory, so as to reduce the interrupt latency when fetching the program instruction.

The data processing system of the present invention, through the re-addressing device, allows the CPU to directly execute the interrupt service routine in the high-speed memory, thus not needing to fetch the entry instruction of the interrupt service routines in the low-speed memory. Therefore, the interrupt latency can be reduced.

The advantage and spirit of the invention may be understood by the following recitations together with the appended drawings.

BRIEF DESCRIPTION OF THE APPENDED DRAWINGS

FIG. 5 is a function block diagram of the re-addressing device of the data processing system shown in FIG. 4.

DETAILED DESCRIPTION OF THE INVENTION

Figure 1:
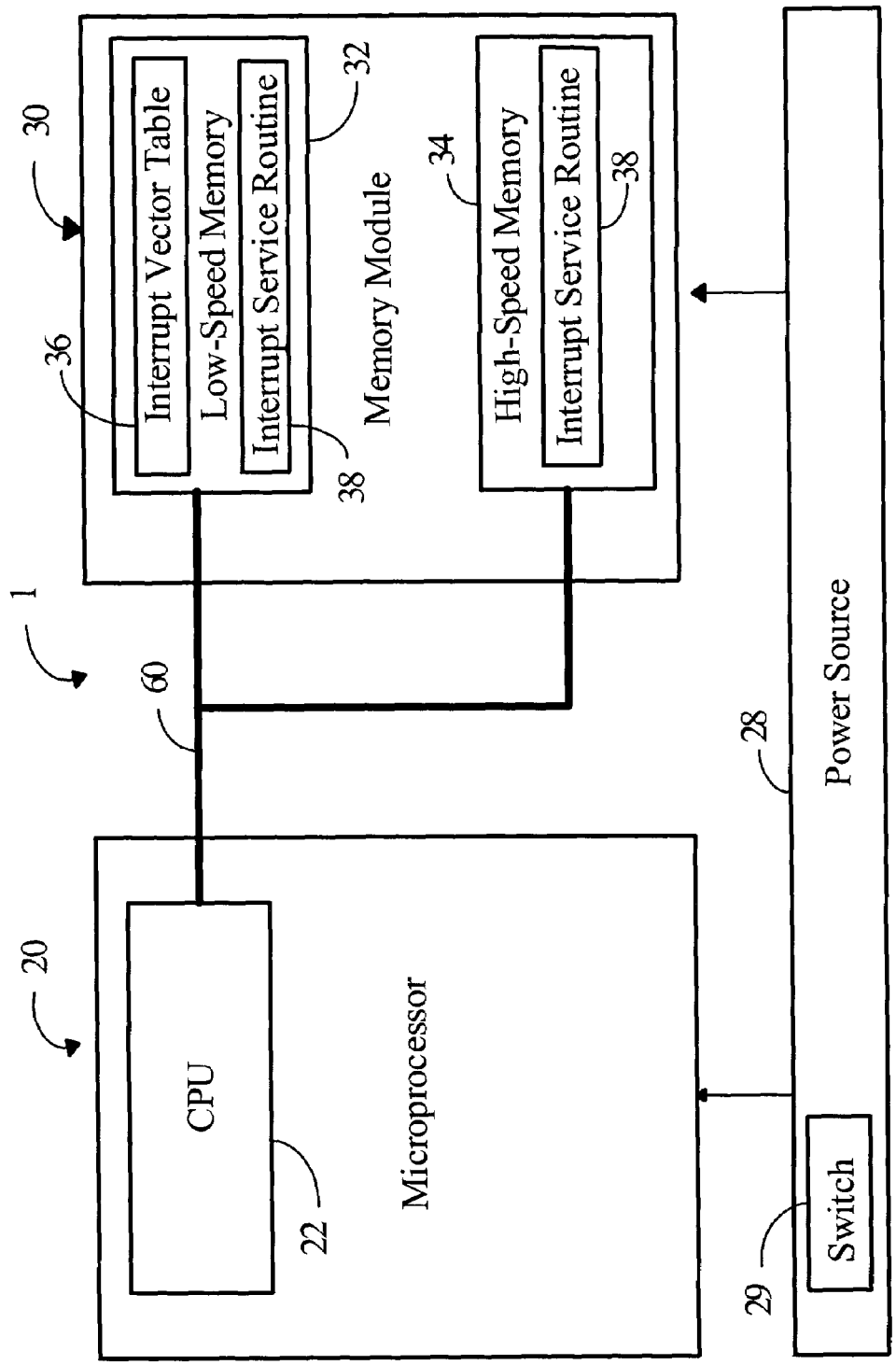
FIG. 1 is a function block diagram of a conventional data processing system.
Figure 2:
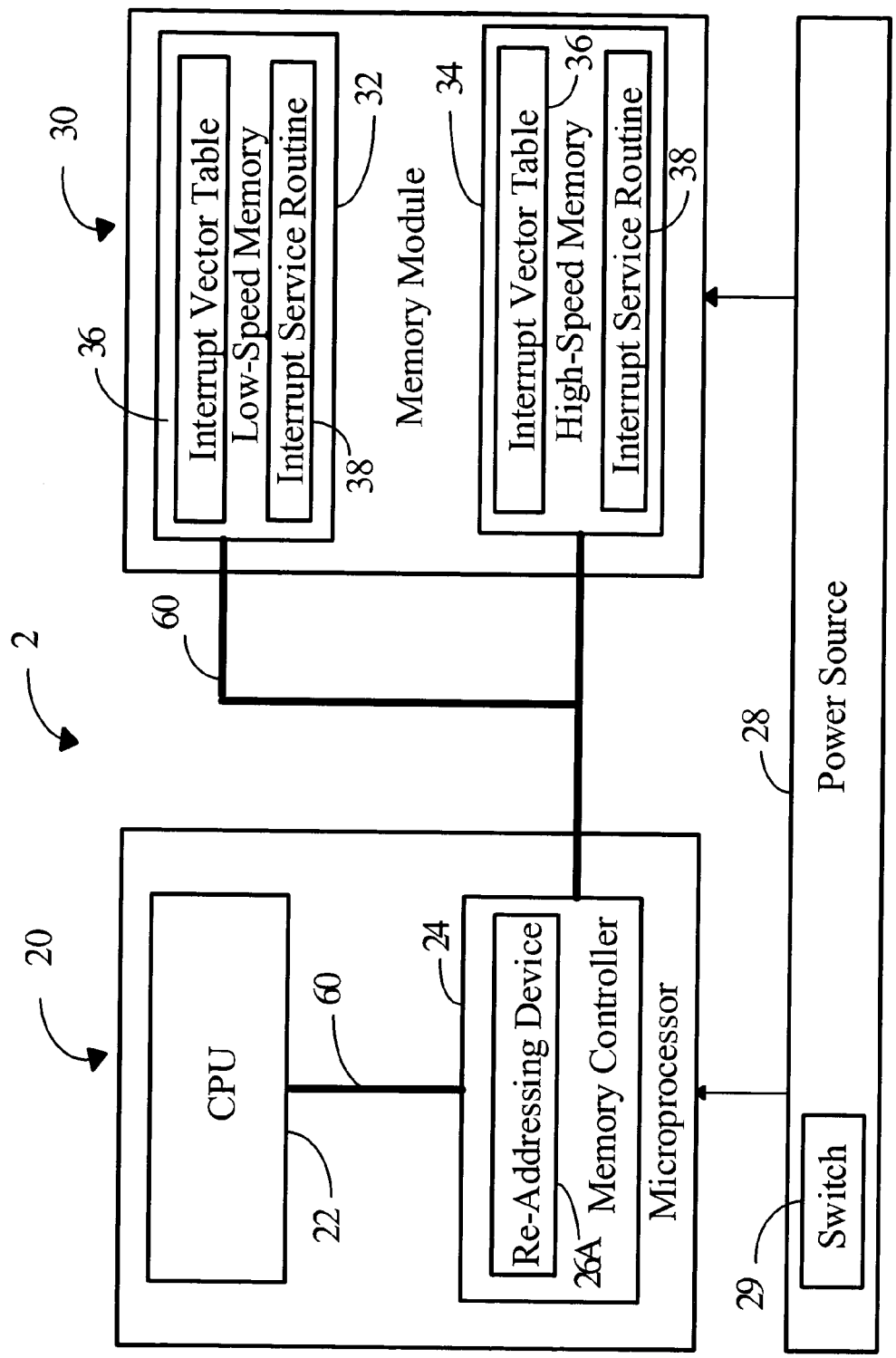
FIG. 2 is a function block diagram of a data processing system according to the present invention.

Referring to FIG. 2, FIG. 2 is a function block diagram of a data processing system 2 according to the present invention. The data processing system 2 comprises a set of memory modules 30 for storing program instructions and data, a microprocessor 20, a power source 28 for providing electrical power to the data processing system 2, and a bus 60.

The set of memory modules 30 comprise a low-speed memory 32 and a high-speed memory 34. Both the low-speed memory 32 and the high-speed memory 34 store an interrupt vector table 36 individually for recording at least one entry instruction of an interrupt service routine 38. In this embodiment, there is one interrupt service routine 38. The entry instruction is the first instruction of the whole interrupt service routine 38.

The power source 28 comprises a switch 29. When the power source 28 is shut down, program instructions and data stored in the high-speed memory 34 are lost; however, program instructions and data stored in the low-speed memory 32 are preserved.

The low-speed memory 32 is a non-volatile memory, such as the electrical programmable read-only memory (EPROM) or the flash read-only memory (Flash ROM). The interrupt vector table 36 and the interrupt service routines 38 stored in the low-speed memory 32 would not be lost when shutting down the power source 28.

The high-speed memory 34 is an external dynamic random access memory (DRAM), which is a volatile memory built outside the microprocessor 20. When booting the microprocessor, the interrupt vector table 36 and the interrupt service routine 38 stored in the low-speed memory 32 are copied into the high-speed memory 34. After shutting down the power source 28, the interrupt vector table 36 and the interrupt service routine 38 stored in the high-speed memory 34 are lost. Besides, the high-speed memory 34 can be a built-in static random access memory (SRAM) in the microprocessor (not shown).

The microprocessor 20 comprises a central processing unit (CPU) 22 for executing program instructions and calculating data. The CPU 22 is designed to fetch program instructions in the low-speed memory 32 when an interruption occurs. The microprocessor 20 can be a non-PC (personal computer) architecture microprocessor, such as the microprocessor for the digital camera.

The microprocessor 20 further comprises a memory controller 24; under the memory controller's control, the CPU 22 fetches the program instruction and accesses the data in the set of memory modules 30. The memory controller 24 also comprises a re-addressing device 26A.

The bus 60 is used to connect the CPU 22, the memory controller 24, and the set of memory modules 30 for transmitting program instructions and data.

When the interruption occurs, the CPU 22 generates an interrupt vector address to the memory controller 24. If the re-addressing device 26A of the memory controller 24 identifies that the address falls within the address range of the interrupt vector table 36, the re-addressing device 36A sends out an enable signal to the high-speed memory 34 which enables the CPU 22 to fetch the corresponding entry instruction of the interrupt service routine in the high-speed memory 34, instead of the predetermined low-speed memory 32, so as to reduce the interrupt latency when fetching the program instruction.

Figure 3:
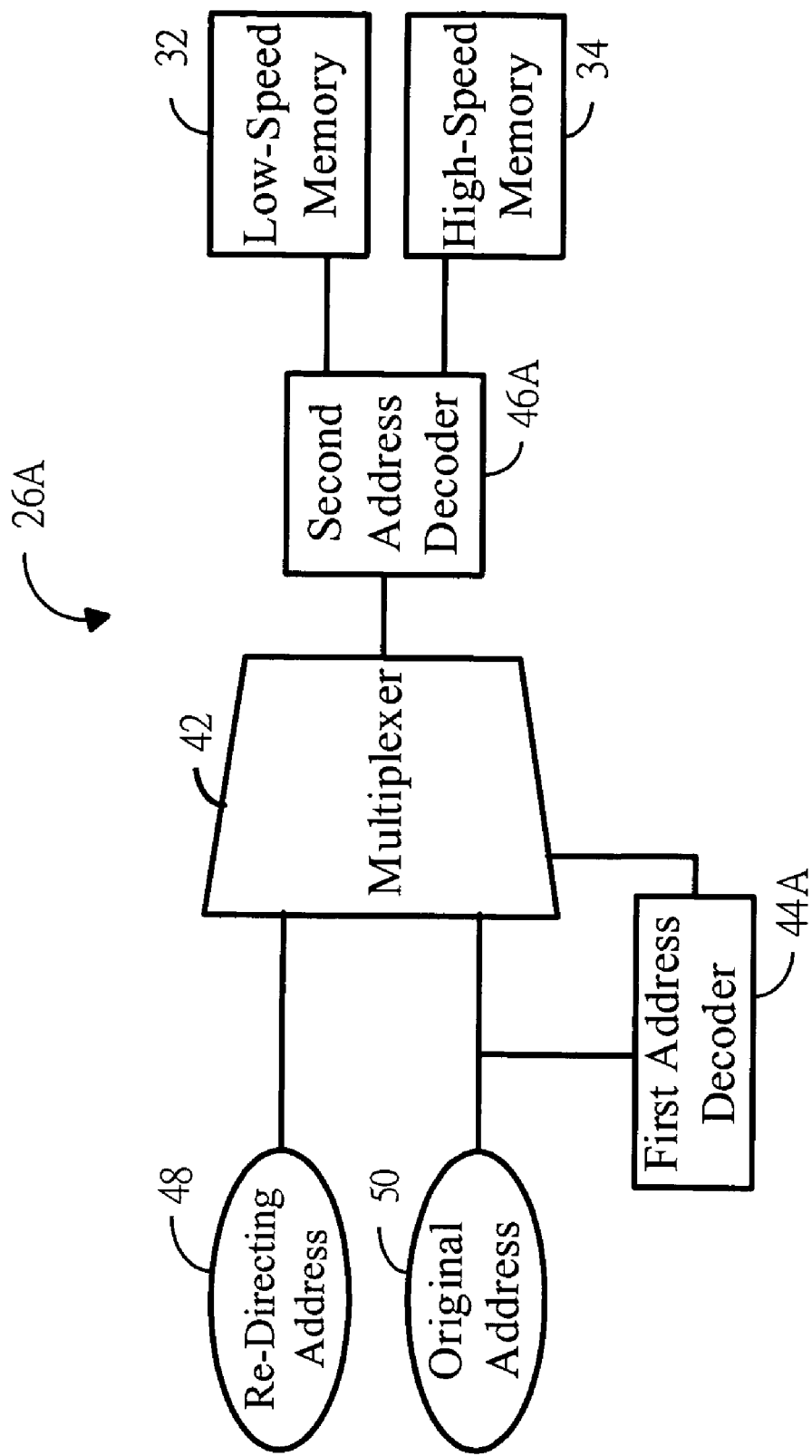
FIG. 3 is a function block diagram of the re-addressing device of the data processing system shown in FIG. 2.

Referring to FIG. 3, FIG. 3 is a function block diagram of the re-addressing device 26A of the data processing system 2 shown in FIG. 2. The re-addressing device 26A comprises a multiplexer 42, a first address decoder 44A, and a second address decoder 46A.

The first address decoder 44A is used for decoding an original address 50 generated by the CPU 22 to identify whether the original address 50 falls within the address range of the interrupt vector table 36. The first address decoder 44A will also generate a corresponding identifying signal.

The multiplexer 42 is used for selecting between the original address 50 generated by the CPU 22 and a predetermined re-directing address 48 as a valid address according to the identifying signal. The re-directing address 48 is programmable and falls within the address range of the high-speed memory 34, distinguishably from the vector addresses of the low-speed memory 32.

The second address decoder 46A is used for decoding the valid address generated by the multiplexer 42 to determine whether the enable signal generated by the memory controller 24 is sent to the high-speed memory 34 or the low-speed memory 32.

When the first address decoder 44A determines that the original address 50 generated by the CPU 22 falls within the address range of the interrupt vector table 36, the multiplexer 42 replaces the original address 50 by the re-directing address 48 that fell within the address range of the high-speed memory 34 to be the valid address. The second address decoder 46A then sends a high-speed enable signal to enable the high-speed memory 34. Therefore, the CPU 22 directly fetches the entry instruction of the interrupt service routine 38 in the high-speed memory 34, instead of the predetermined low-speed memory 32.

When the first address decoder 44A determines that the original address 50 generated by the CPU 22 does not fall within the address range of the interrupt vector table 36, the multiplexer 42 selects the original address 50 to be the valid address. The second address decoder 46A then sends an enable signal to the memory where the original address 50 is located according to the valid address.

Figure 4:
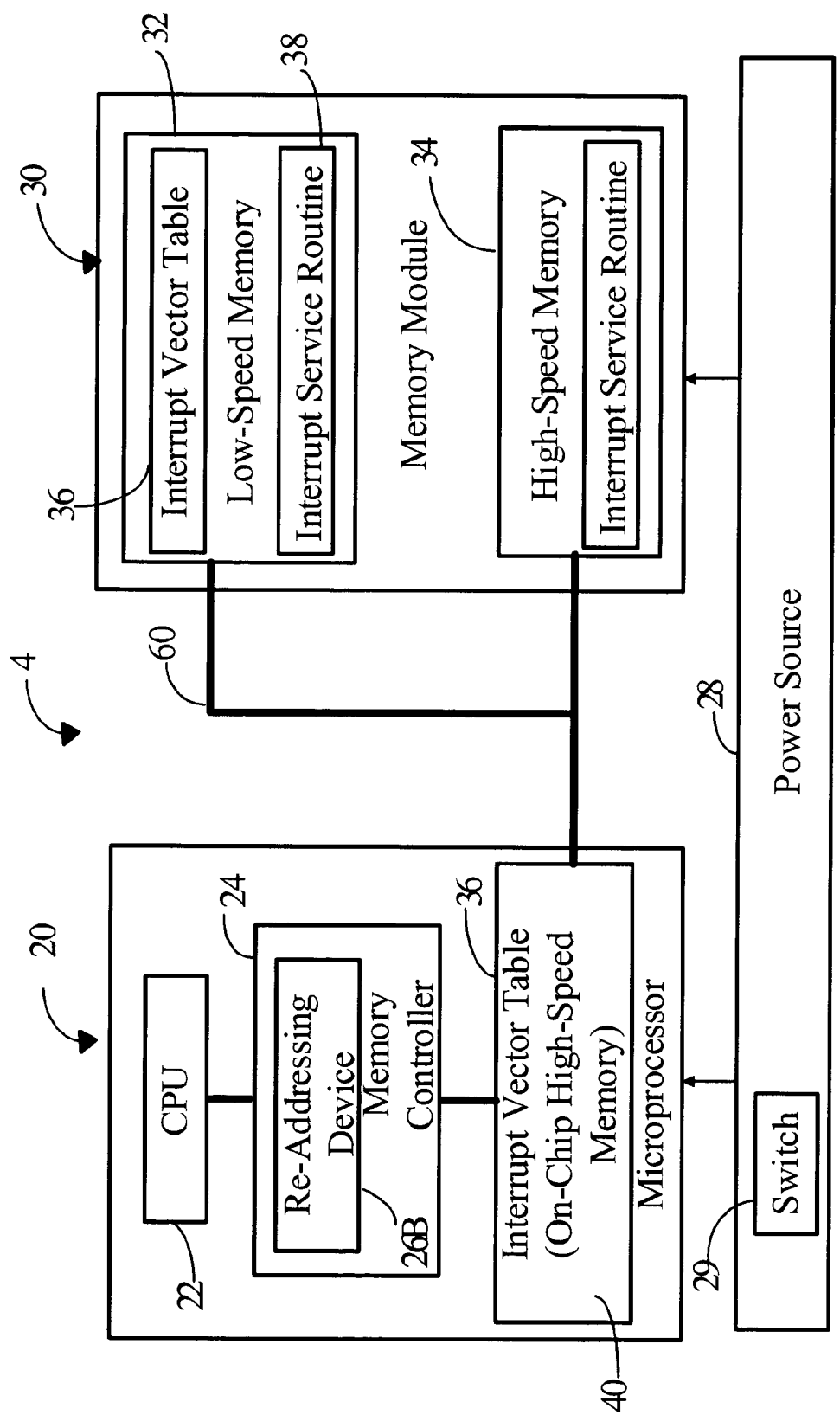
FIG. 4 is a function block diagram of another data processing system according to the present invention.

Referring to FIG. 4, FIG. 4 is a function block diagram of another data processing system 4 according to the present invention. The main difference between the data processing system 4 and the data processing system 2 is that the data processing system 4 further comprises an on-chip high-speed memory 40. The re-addressing device 26B of the data processing system 4 is different from the re-addressing device 26A of the data processing system 2. The on-chip high-speed memory 40 also comprises an interrupt vector table 36 for recording at least one entry instruction of the interrupt service routine 38, and the vector address range is the same as the vector address range of the interrupt vector table 36 of the low-speed memory 32. The other elements and functions of the data processing system 4 are similar to those of the data processing system 2 and have described above, and would not be described here again.

When an interruption occurs, the CPU 22 generates an interrupt vector address to the memory controller 24. If the re-addressing device 26B of the memory controller 24 identifies that the interrupt vector address falls within the address range of the interrupt vector table 36, the re-addressing device 26B sends out an enable signal to the on-chip high-speed memory 40 which enables the CPU 22 to fetch the corresponding entry instruction of the interrupt service routines 38 in the high-speed memory 40, instead of the predetermined low-speed memory 32, so as to reduce the interrupt latency when fetching the program instruction.

Referring to FIG. 5, FIG. 5 is a function block diagram of the re-addressing device 26B of the data processing system 4 shown in FIG. 4. The re-addressing device 26B comprises a first address decoder 44B, a second address decoder 46B, and a XOR (exclusive or) gate 52.

The first address decoder 44B is used for decoding an original address generated by the CPU 22 to determine whether the original address falls within the address range of the interrupt vector table 36, and to generate a corresponding on-chip enable signal to enable the on-chip high-speed memory 40.

The second address decoder 46B is used for decoding the original address generated by the CPU 22 to determine whether the original address falls within the address range of the high-speed memory 34 or the low-speed memory 32; then it will correspondingly generate a high-speed enable signal to enable the high-speed memory 34 or generate a corresponding identifying signal of the low-speed memory.

The XOR gate 52 is used for receiving the on-chip enable signal and the identifying signal of the low-speed memory to perform exclusive-or operation and correspondingly to generate a low-speed enable signal to enable the low-speed memory 32.

Comparing to the prior art, the data processing system of the present invention, through the re-addressing device, allows the CPU to directly fetch the entry instruction of the interrupt service routines in the on-chip high-speed memory, thus not needing to fetch the entry instruction of the interrupt service routines in the low-speed non-volatile memory. Therefore, the interrupt latency can be reduced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system comprising:
   a set of memory modules for storing program instructions and data, the set of memory modules comprising at least one low-speed memory and at least one high-speed memory, the low-speed and high-speed memories both storing an interrupt vector table individually for recording at least one entry instruction of an interrupt service routine; and
   a microprocessor comprising:
      a central processing unit (CPU) for executing program instructions and calculating data, wherein the CPU is designed to fetch the program instructions in the low-speed memory when an interruption occurs; and
      a memory controller to enable the CPU, under the memory controller's control, to fetch the program instruction and access the data in the set of memory modules, the memory controller also comprising a first re-addressing device;
   wherein, when the interruption occurs, the CPU generates an interrupt vector address for the memory controller, and when re-addressing device of the memory controller identifies that the interrupt vector address falls within the address range of the interrupt vector table, the re-addressing device sending an enable signal to the high-speed memory enabling the CPU to fetch the corresponding entry instruction of the interrupt service routines stored in the high-speed memory, instead of the predetermined low-speed memory, so as to reduce the interrupt latency when fetching the program instruction.

2. The data processing system of claim 1, wherein the re-addressing device comprises:
   a first address decoder for decoding an original address generated by the CPU to identify whether the original address falls within the address range of the interrupt vector table, and to generate a corresponding identifying signal;
   a multiplexer for selecting between the original address generated by the CPU and a predetermined re-directing address as a valid address according to the identifying signal; and
   a second address decoder for decoding the valid address generated by the multiplexer to determine whether the enable signal is sent to the high-speed memory or the low-speed memory.

3. The data processing system of claim 2, wherein the re-directing address is programmable, and falls within the address range of the high-speed memory, distinguishably from the vector addresses of the low-speed memory.

4. The data processing system of claim 1, wherein the microprocessor further comprises an on-chip high-speed memory, and the on-chip high-speed memory also comprises an interrupt vector table for recording at least one entry instruction of the interrupt service routines, and the vector address range is the same as the vector address range of the interrupt vector table of the low-speed memory.

5. The data processing system of claim 4, wherein the re-addressing device comprises:
   a first address decoder for decoding an original address generated by the CPU to determine whether the original address falls within the address range of the interrupt vector table, and to generate a corresponding on-chip enable signal to enable the on-chip high-speed memory;
   a second address decoder for decoding the original address generated by the CPU to determine whether the original address falls within the address range of the high-speed or the low-speed memory, and correspondingly to generate a high-speed enable signal to enable the high-speed memory, or to generate an identifying signal of the low-speed memory; and
   an XOR gate for receiving the on-chip enable signal and the identifying signal of the low-speed memory to perform exclusive-or operation, and correspondingly to generate a low-speed enable signal to enable the low-speed memory.

6. The data processing system of claim 1, wherein the low-speed memory is a non-volatile memory.

7. The data processing system of claim 6, wherein the non-volatile memory is an electrical programmable read-only memory (EPROM).

8. The data processing system of claim 6, wherein the non-volatile memory is a flash read-only memory (Flash ROM).

9. The data processing system of claim 1, wherein the high-speed memory is a volatile memory.

10. The data processing system of claim 9, wherein the volatile memory is an external dynamic random access memory (DRAM) built outside the microprocessor.

11. The data processing system of claim 9, wherein the volatile memory is a built-in static random access memory (SRAM) in the microprocessor.

12. The data processing system of claim 1, wherein the microprocessor is a non-PC architecture microprocessor.

13. The data processing system of claim 1, wherein the data processing system further comprises a power source for providing electrical power to the data processing system, and when the power source is shut down, the program instructions and data stored in the high-speed memory are lost; however the program instructions and data stored in the low-speed memory are preserved.

14. The data processing system of claim 1, wherein the data processing system further comprises a bus connected to the CPU, the memory controller, and the set of memory modules for transmitting the program instructions and data.

* * * * *